Dec. 1, 1959     C. E. VANDENBERG     2,914,914
THREE DIMENSIONAL VARIABLE EXHAUST NOZZLE

Filed Jan. 3, 1957     3 Sheets-Sheet 1

INVENTOR.
CORNELIUS E. VANDENBERG
BY
ATTORNEY

Dec. 1, 1959  C. E. VANDENBERG  2,914,914
THREE DIMENSIONAL VARIABLE EXHAUST NOZZLE
Filed Jan. 3, 1957  3 Sheets-Sheet 2

INVENTOR.
CORNELIUS E. VANDENBERG
BY
ATTORNEY

United States Patent Office 2,914,914
Patented Dec. 1, 1959

2,914,914

THREE DIMENSIONAL VARIABLE EXHAUST NOZZLE

Cornelius E. Vandenberg, Fullerton, Calif., assignor to North American Aviation, Inc.

Application January 3, 1957, Serial No. 632,305

8 Claims. (Cl. 60—35.6)

This invention relates to a means to vary the cross-sectional area of a jet engine exhaust nozzle and more particularly to a three-dimensional variable area exhaust nozzle.

The nozzle on a ram or turbo jet engine is the means in which a high efficiency conversion of pressure and temperature energy of the combustion gases to velocity or kinetic energy of the exhaust stream is accomplished. As the flight Mach numbers increase above approximately 2.3, the need for a nozzle to achieve such a conversion becomes increasingly great.

Jet engines are conventionally provided with an exhaust nozzle having a restricted orifice immediately aft of the combustion chamber. When a jet engine operates at off-design flight Mach number and/or altitude, the efficiency of the engine is decreased if the cross-sectional area of the nozzle is not varied. An exhaust nozzle capable of being varied makes possible a readjustment of the exhaust nozzle area to diffuser inlet area as required for optimum operating efficiency by changes in the flight Mach number and/or altitude. In other words, a variable area exhaust nozzle of a jet engine makes possible an efficient matching between the diffuser operating conditions and the nozzle so that variations in heat addition to the inlet airflow as required by off-design flight Mach numbers and/or altitudes can be converted most efficiently to engine thrust.

It has been found that gas flowing past a solid body does not detect where the solid body surface is but is guided only by the pressure gradient imposed by the boundary layer gas on the surface of the body, and that the gas stream flowing longitudinally along the body is guided by the boundary layer which is developed so as to extend beyond the body surface. It is the latter principle which led to the present invention of a completely variable three-dimensional exhaust nozzle.

Jet engines generally are cylindrical in shape because of the requirements of efficient structural, aerodynamic, and thermodynamic design and the use therewith of a three-dimensional or generally circular exhaust nozzle is highly preferred over that of a rectangular or square two-dimensional exhaust nozzle. In both, stream tube combustion gases approaching the nozzle are deflected to fill the exhaust volume. However, in the latter, regions of corner losses are developed due to the excessive frictional drag in the squared corners. Thus in a two-dimensional nozzle, the area required for the passage of a given flow of combustion gas is considerably greater than that required in a symmetrically converging three-dimensional nozzle. In the two dimensional type of nozzle, peripheral layers of the gas are developed having decreased velocities outwardly from the center of the nozzle toward the corners. That is, the regions or layers of flow in the corners are relatively slow moving so as to reduce the mass flow for a given nozzle cross-sectional area by a considerable amount.

In contrast, in a three-dimensional nozzle as provided in the present invention, there is developed in the center and outwardly therefrom a region of high constant velocity of considerable diameter; adjacent to the wall of the nozzle are developed annular regions of decreased velocity due to the wall friction effects. However, these latter regions become very thin in a good design and therefore, there is only a relatively small cross-sectional area having a decreased velocity flow.

According to the present invention, a three-dimensional variable exhaust nozzle is provided in the engine exhaust tube aft of the combustion chamber. The nozzle as provided is comprised of one or two sets of flaps, each set being pivotally mounted adjacent the internal periphery of said exhaust tube. That is, each of the forward set of flaps may be hinged at one end thereof to the exhaust tube and the other or free ends of said flaps may be directed rearward to form a generally circular duct. The other or aft set of flaps may be hinged to the exhaust tube adjacent its after end to form a similar generally circular nozzle, said flaps having their free ends directed forward. The forward and aft flaps are not connected with each other and a hiatus may exist longitudinally between them in the exhaust tube or they may be of such lengths to telescope in a closed or partially closed position.

Flow into the regions between the exterior of the flaps and the interior of the exhaust tube will occur only during engine starting and will stop when the pressure between the exterior of the flaps and the interior of the tube is equal to the pressure developed in the duct formed by the flaps, provided no appreciable leakage exists between the flaps or at their hinge points. Under certain operating conditions a slight amount of circulatory flow may occur externally of the flaps in the exhaust tube even though there is no leakage between the flaps. However, such losses associated with the latter circulation are ordinarily negligible.

It is, therefore, an object of the present invention to provide an improved variable jet engine nozzle.

It is a principal object of the present invention to provide a completely variable three-dimensional exhaust nozzle.

It is a further object of the present invention to provide a two section three-dimensional exhaust nozzle having a longitudinal hiatus between the sections.

It is another object of the present invention to provide a three-dimensional exhaust nozzle in which the boundary layer developed along the nozzle surface extends longitudinally beyond the nozzle surface to form an efficient gas surface nozzle to control the flow of combustion gases from a jet engine.

Other objects of the present invention will become apparent from the following description taken in connection with the accompanying drawings, in which Fig. 1 illustrates a partial cut away cross sectional view of the present invention as it may be used in a guided missile or other aircraft;

Figure 1:
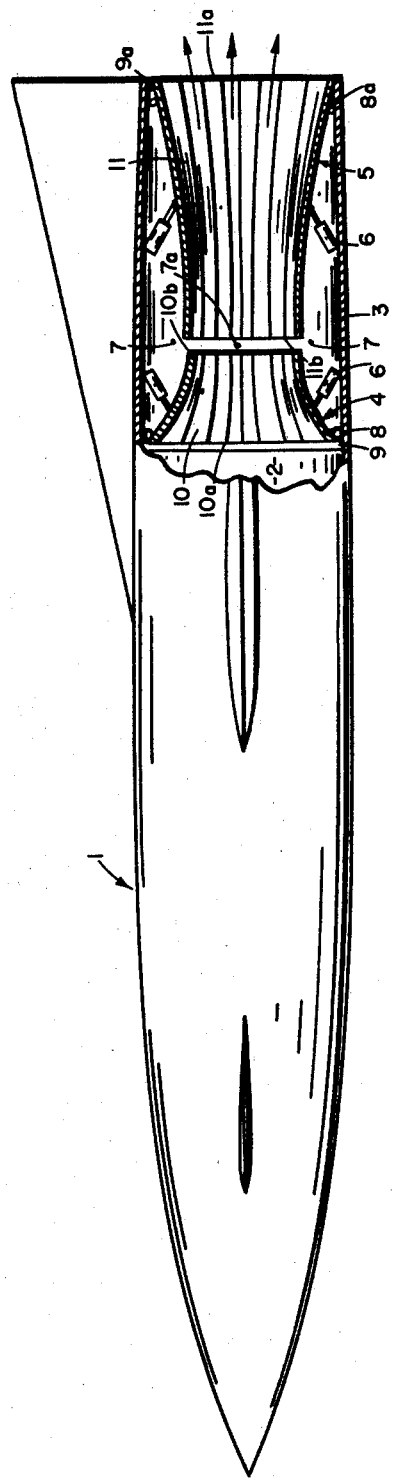

Referring to Fig. 1, a jet powered aircraft or missile 1 is shown having a variable exhaust nozzle formed of circularly disposed flap members 10 and 11 in exhaust tube 3. Elongated flap members 10 may be typically connected to exhaust tube 3 by hinges 8 aft of engine combustion chamber 2 to form forward exhaust duct 4 which has the general configuration of a truncated cone in its partially closed position shown. That is, flaps 10 are consecutively circularly arranged having one end 10a thereof connected to the internal periphery of the exhaust tube 3 so that when the flaps are pivoted at said one end on hinges 8 the other or rearward free end 10b thereof may be moved radially toward or away from the longitudinal axis of the exhaust tube 3.

Figure 2:
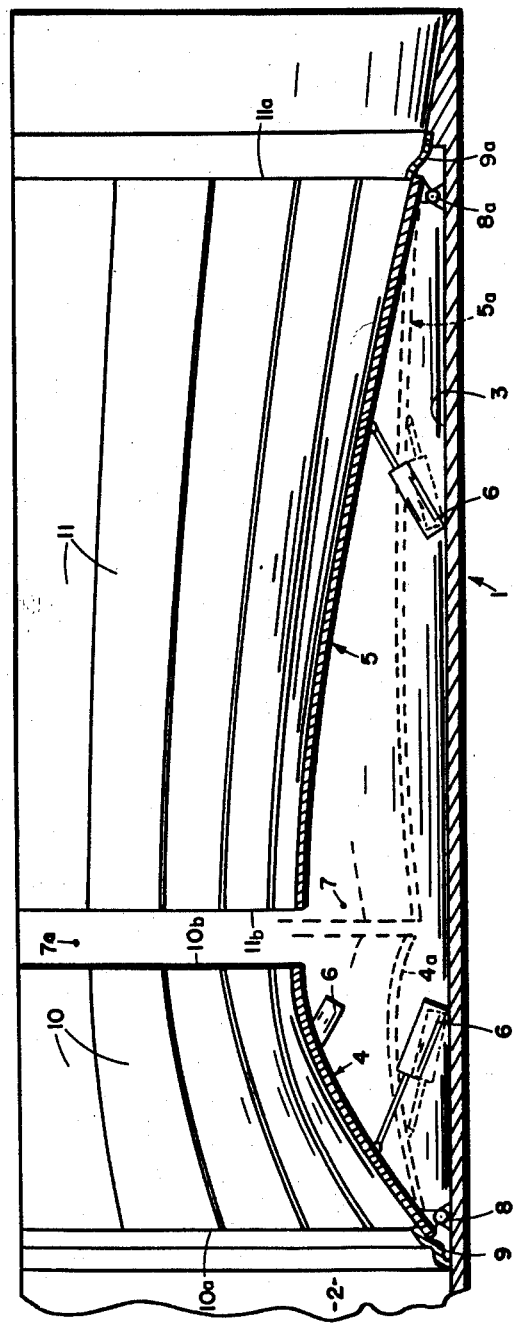
Fig. 2 shows a fragmentary detailed view of the nozzle and exhaust tube shown in Fig. 1.
Figure 3:
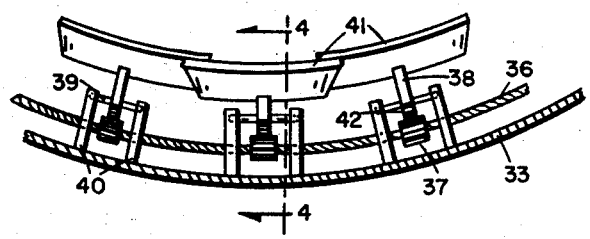
Fig. 3 is a cutaway end view of one set of nozzle flaps having a cable actuation system.

A ring-shaped seal 9 typically made of a spring metal, more clearly shown in Fig. 2, may be secured along the interior surface of the exhaust tube just aft of the combustion chamber 2 so as to have its forwardly directed edge in spring contact with the interior surface of each flap 10 having some sealing effect for all pivoted positions between the exterior of the flaps and their interior to prevent leakage from the combustion chamber to the exterior side of the individual flaps. The flaps may be arranged so as to alternately overlap, as shown in Fig. 3, or be juxtaposed to consecutively overlap each succeeding one in a conventional manner as indicated in Figs. 1 and 2. In order to attain the best possible seal, the flaps should overlap slightly at their hinged ends 10a. If the flaps are arranged edge-to-edge transversely adjacent the hinges, they should be fitted to start to overlap a short distance longitudinally from said hinged ends at a predetermined diameter of the duct somewhere between the hinged ends and the seal. When the flaps thus overlap, they will contact each other and thereby form a longitudinal seal between the interior of the duct formed thereby and the exterior thereof.

Duct 5 is located aft of duct 4 and is formed in a similar or identical manner thereto, except that the free ends 11b of flaps 11 are directed forward to the gap 7a. The hinged ends 11a are connected to exhaust tube 3 by hinges 8a near its aft end. Spring seal 9a, similar or identical to seal 9 but reversed having its rearwardly directed edge in spring contact with the flaps, prevents exhaust gas leakages into the area between the exterior of flaps 11 and the interior of exhaust tube 3 through the hinges 8a.

In operation the flaps are moved radially inwardly and outwardly in accordance with the thrust required depending upon the speed and altitude of the aircraft. Movement of the individual flaps may be typically accomplished by hydraulic or pneumatic actuators 6, each of which would operate one flap by its piston rod connected to the external side of said flap. The actuators are connected within the exhaust tube and may be remotely controlled by a conventional means, such as an automatic valve or by a hand operated lever, not shown. According to the present invention, there is developed an annular quiescent gas region 7 which causes the formation of an aerodynamic wall around gap 7a, said wall having a boundary layer at the same circumferential level as that extending longitudinally between ducts 4 and 5. It is the development of this boundary layer inward of quiescent gas region 7 which makes the present invention successful and further, which makes possible a completely variable three-dimensional nozzle.

In Fig. 2, showing a partial but enlarged view of the embodiment in Fig. 1, the extreme open positions of the ducts 4 and 5 are shown in broken lines and are designated as 4a and 5a, respectively.

Figure 4:
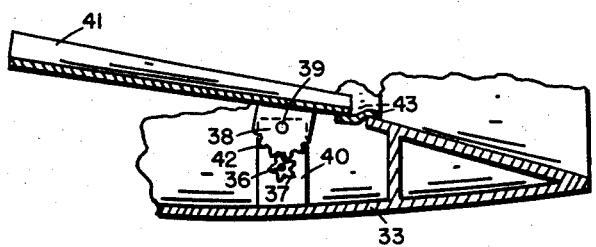
Fig. 4 is a view taken along the line 4—4 of Fig. 3.

In Figs. 3 and 4 another type of flap actuating means is illustrated. Fig. 3 shows a partial end view of an exhaust tube 33 of a jet engine in which the flaps 41 are secured to hinge members 38, each of which rotates on a shaft 39 extending therethrough. A substantially semicircular gear 42 extends radially outward from each hinge member 38 and is engaged with a cable driven pinion 37. Each pinion 37 is mounted on an actuating cable 36 which may be rotated by a conventional 24 volt motor, not shown, frequently used to actuate cowl flaps. Supports 40 are secured to the internal surface of tube 33 to provide a supporting means for shafts 39 and rotating cable 36. An annular spring seal 43 is shown in Fig. 4 abutting the exterior of flaps 41 and is secured to the exhaust tube structure so as to prevent combustion gas leakage adjacent the flap pivot point into the quiescent gas region.

In Fig. 3 flaps 41 are shown to have every other flap overlapping the two flaps juxtaposed thereto. At the hinge point the flaps may overlap; however, if they do not, as they extend longitudinally toward the free ends and toward the smaller of the differing diameters of the ducts, the flaps must be fitted so that they will overlap as they close and decrease the duct area. Using the cable actuating means, the flaps may also be arranged so that each flap will externally overlap the next succeeding flap. In both types of the overlapping arrangements, the flaps must be prearranged so that when they move radially inward at the free ends, the overlapping will occur as desired. One way to do this is to have the free ends of the flaps, as in Fig. 3, of such widths so that the overlapping area on the external flap will be wide enough to always be external of the overlapped surface on the two inner flaps.

Alternate embodiments of the invention may be made by using one duct instead of two, such as either duct 4 or 5 in Fig. 1. One duct 4, for example, is designed to function as a variable nozzle in an exhaust tube along with the development of an annular aerodynamic wall rearward longitudinally externally thereof, and of the development of a quiescent gas region in the area radially externally of the duct and of the aerodynamic wall. These aerodynamic formations, conceived after considerable study and experimentation, produce the unusual result along with a flap formed duct of creating a completely variable three-dimensional nozzle. In a similar manner, if duct 4 were omitted from Fig. 1, an annular aerodynamic wall would exist between the combustion chamber 2 and the opening of duct 5 and a quiescent gas region would exist between the external surface of duct 5 and internal surface of tube 3.

Although the invention has been described and illustrated in detail, it is to be clearly understood that the same is by way of illustration example only and is not to be taken by way of limitation, the spirit and scope of this invention being limited only by the terms of the appended claims.

I claim:

1. In a jet powered aircraft, a three-dimensional variable nozzle comprising a jet engine exhaust tube, a plurality of first elongated members pivotally mounted at one end thereof in said tube along its inner periphery and adjacent the aft end thereof, said first members being juxtaposed circumferentially of the tube and being directed forwardly, means to rotate each of said first members about said one end to cause the other ends thereof to be moved radially inward and outward, a plurality of second elongated members pivotally mounted at one end thereof in said tube along its inner periphery at a position forward of said first members, said second members being juxtaposed circumferentially of the tube and being directed aft, means to rotate each of said second members about said one end to cause the other ends thereof to be moved radially inward and outward, and a gap within said tube longitudinally between said first and second members.

2. In a jet powered aircraft having an exhaust tube, a three-dimensional variable nozzle comprising first members hingedly secured at one end thereof in the exhaust tube, said first members being circularly juxtaposed and directed forwardly from said one end, said first members forming a substantially truncated cone-shaped first duct, second members hingedly secured at one end thereof in said tube forward of said first members, said second members being circularly juxtaposed and directed aft from said one end, said second members forming a substantially truncated cone-shaped second duct, a longitudinal hiatus within said tube between said first and second ducts, and means to vary the diameters of said ducts adjacent said other ends of said members.

3. In a jet powered aircraft, a three-dimensional variable nozzle comprising a jet engine exhaust tube, first individual elongated flap members having one end pivotally mounted adjacent the internal periphery and the after portion of said tube, said first members being circumferentially juxtaposed and having the other ends thereof directed forwardly, second individual elongated flap members having one end pivotally mounted forward of said first members adjacent the internal periphery of said tube, said second members being circumferentially juxtaposed and having the other end thereof directed aft, means to move said other ends radially inwardly and outwardly in said tube, and a longitudinal hiatus between said other ends in said tube.

4. In a jet powered aircraft having a combustion chamber, a three dimensional variable nozzle comprising a jet engine exhaust tube, a first duct secured within said tube and forming a portion of said nozzle, a second duct secured in said tube forward of said first duct and forming a portion of said nozzle, said second duct being aft of, but adjacent to, the combustion chamber, said ducts being in longitudinal alignment and being open to each other and to said tube by means of a longitudinal hiatus between their adjacent ends, and means to vary the size of the openings of the adjacent ends of said ducts.

5. In a jet powered aircraft having a combustion chamber, a three-dimensional variable nozzle comprising a jet engine exhaust tube extending rearwardly from said combustion chamber, first elongated flaps pivotally mounted at one end thereof adjacent to the internal periphery of the after end of said tube, said first flaps extending forwardly from said mounting and being circumferentially juxtaposed to form a first duct, means to move the other ends of said first flaps radially inward and outward to vary the circumferential dimensions of said first duct, second elongated flaps pivotally mounted at one end thereof adjacent to the internal periphery of said tube aft of said combustion chamber, said second flaps extending rearwardly from said mounting and being circumferentially juxtaposed to form a second duct, means to move the other ends of said second flaps radially inward and outward to vary the circumferential dimensions of said second duct, and a longitudinal hiatus within said tube between said ducts.

6. In a jet powered aircraft having a combustion chamber, a three-dimensional variable nozzle comprising a jet engine exhaust tube, a first duct secured within said tube forming a portion of said nozzle, a second duct secured in said tube forward of said first duct and forming a portion of said nozzle, said second duct being aft of, but adjacent to, the combustion chamber, said ducts being in longitudinal alignment and being open to each other and to said tube by means of a longitudinal hiatus between their adjacent ends, the adjacent ends of said ducts having differing diameters in the longitudinal direction, and means to vary said differing diameters in said ducts.

7. In a jet powered aircraft, a three-dimensional variable nozzle comprising a jet engine exhaust tube, first members secured at a first end thereof in said exhaust tube, each of said first members having a hinge connecting each of said first ends to said tube, said first members being circularly juxtaposed and directed forwardly from said first end, the other end of said first members being connected to move radially inwardly and outwardly, said first members forming a first duct, first sealing means secured to said tube adjacent said first ends of said first members and being directed forwardly to extend inwardly over said first ends of said first members, second members secured at a first end thereof in said tube forward of said first members, each of said second members having a hinge connecting each of said first ends to said tube, said second members being circularly juxtaposed and directed aft from said first end, the other ends of said second members being connected to move radially inwardly and outwardly, said second members forming a second duct, second sealing means secured to said tube adjacent said first ends of said second members and being directed aft to extend inwardly over said first ends of said second members, a longitudinal hiatus in said tube between said first and said second ducts, and means to vary the diameters of said annuli adjacent said other ends of said members.

8. The invention according to claim 7 in which the hiatus between said ducts is of such length that a boundary layer formed by the flow of gases on said internal surfaces of said ducts will be continuous over said ducts and said hiatus, and in which a quiescent gas zone is formed between the external surfaces of said ducts and the internal surfaces of said tube and externally of said boundary layer.

References Cited in the file of this patent

UNITED STATES PATENTS

| | | |
|---|---|---|
| 2,770,944 | Jordan | Nov. 20, 1956 |
| 2,780,056 | Colley | Feb. 5, 1957 |